Feb. 11, 1969  G. L. DAFLER  3,426,602
RESILIENT SNUBBER FOR GOVERNOR ASSEMBLY
Filed Oct. 7, 1965

INVENTOR.
GENE L. DAFLER
BY
Albert T. Reuther
ATTORNEY

United States Patent Office 3,426,602
Patented Feb. 11, 1969

3,426,602
RESILIENT SNUBBER FOR GOVERNOR ASSEMBLY
Gene L. Dafler, New Lebanon, Ohio, assignor to General Motors Corporation, Detroit, Mich., a corporation of Delaware
Filed Oct. 7, 1965, Ser. No. 493,763
U.S. Cl. 73—526                9 Claims
Int. Cl. G01p 3/16

ABSTRACT OF THE DISCLOSURE

A centrifugal switch governor assembly comprising a shaft mounted backing member having opposite flange and tang portions forming V-shaped recesses in radially opposite locations. An axially slidable switch actuating member may be moved by weights attached to pivotally movable arms in engagement with the switch actuating member. A plastic plate member, located on one side of the backing member with respective opposite ends thereof extending through respective V-shaped recesses in the backing member, is resiliently engaged by the switch actuating member. A spring located on the side of the backing member opposite the plastic plate member engages the tang portions of the backing member and the ends of the plastic plate member extending therethrough for resiliently backing the end of the plastic plate member.

This invention relates to noise suppression on a centrifugal switch governor assembly, and, more particularly, to a resilient snubber means added thereto.

Problems of governor noise have been encountered under certain circumstances with electric motors or dynamoelectric machines which are subjected to torsional vibration. On some motors, a rotor thereof does not rotate as smoothly as on others. For example, the governor "buzzes" when energized with an eight pole winding more than with six or four pole windings. As a result, an angular acceleration causes governor parts or components to lag the parts connected solidly to a rotor shaft and weights or fingers of a governor assembly will resound or "buzz" with a noticeable though avoidable noise. Accordingly, an object of the present invention is to suppress the noise associated with motor governors which are subjected to torsional vibration.

Another object of this invention is to provide a resilient stop structure on a centrifugal switch governor assembly including an axially movable switch actuating member as well as finger or weight means pivotally mounted thereto which are engageable with a plastic plate backed by spring means directly adjacent thereto.

A further object of this invention is to provide a resilient stop structure on a centrifugal switch governor assembly with a substantially U-shaped backing member secured to a motor rotor shaft, the backing member having a pair of reverse bent tangs which collectively have a U-shaped configuration with opposite ends of the backing member, and a plastic plate centrally apertured to complement the shaft though, radially outwardly thereof, opposite ends of the plastic plate have undercut lateral edging that fits complementary through opening left by the tangs in the backing member on one side thereof as well as spring means fitted into mounting on an opposite side of the backing member and in engagement with the radially outwardly opposite ends of the plastic plate which spaces pivotal fingers or weights during resilient spring backing thereof, the fingers or weights having a predetermined path of travel to shift an axially movable switch actuating member also provided with axial bumper engagement with the plastic plate in at least one position.

Another object of this invention is to provide a substantially C-shaped or laterally slotted spring means having a lateral slide fit into locking engagement with one side of a backing member of a governor assembly and a plastic plate including opposite free ends backed by the spring means though complementary to an opposite side of the backing member.

Further objects and advantages of the present invention will be apparent from the following description, reference being had to the accompanying drawing wherein preferred embodiments of the present invention are clearly shown.

Figure 1:
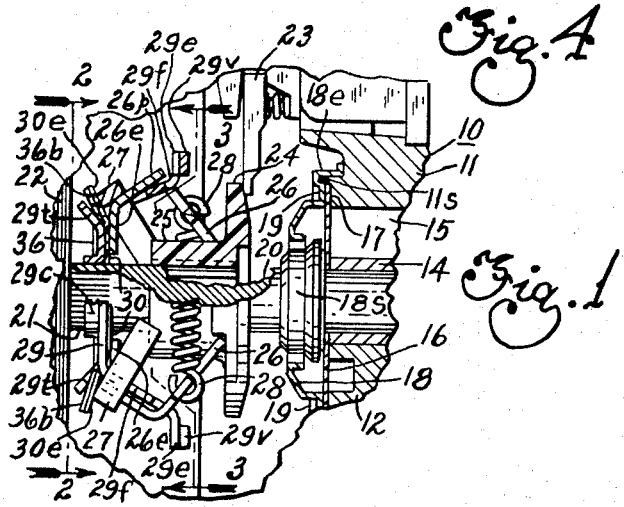
FIGURE 1 is a partially sectioned fragmentary elevational view of a centrifugal switch governor assembly having resilient snubber structure in accordance with the present invention.

In FIGURE 1 there is shown a portion of a motor or dynamoelectric machine means generally indicated by numeral 10. The motor includes an end frame means including a central hub portion 11 with radial spoke or spider structure 12 for mounting of a bearing means 14. A lubricating cavity 15 is provided in a well known manner. A X-shaped thrust plate 16 is placed onto the end frame or hub portion 11 and fits into an annular recessing 17. This thrust plate 16 as placed in the recessing of the end frame is confined in a close tolerance diameter to maintain proper concentricity of the inside diameter or aperture of the thrust plate axially as to the motor shaft. An oil cover 18 with an annular configuration is pressed axially at a radially inner location 19 to conform to the recessing 17 except for each of four bumps or stops complementary to the X-shaped thrust plate 16 in substantially diagonally or diametrically opposite locations. The hub or end frame 11 has a tubular portion 11s around which an outer peripheral edging 18e of the oil cover 18 is crimped in axially depressed interfit to the hub or end frame portion 11. The depression 19 in effect becomes an annular projection which is deformed or crushed to conform to the thrust plate in a star-like configuration. The thrust plate is thus trapped to prevent rotation by these four deformed places. An oil shield or slinger portion 18s is carried on a shaft 20 in a location radially inwardly from the oil cover.

Figure 4:
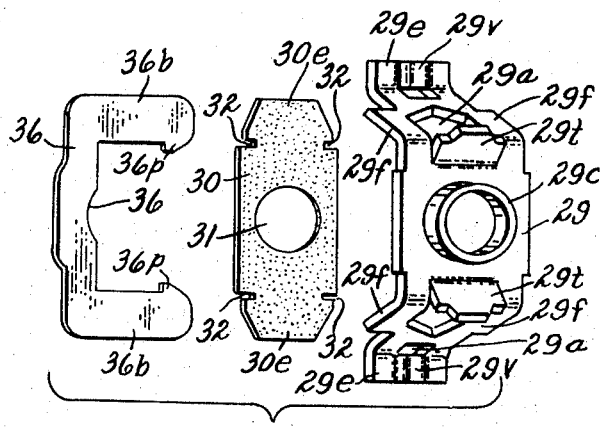
FIGURE 4 is an exploded perspective view of resilient snubber structure shown in views of FIGURES 1, 2 and 3.

The shaft 20 in a location axially to one side of the thrust plate and oil cover structure has a knurled or roughened periphery 21 immediately adjacent to a laminated rotor structure 22. The rotor structure is located radially inwardly from magnetic stator core means in a well known manner. Reference is made to a copending application Ser. No. 493,770, filed Oct. 7, 1965, in which further stator frame assembly and structure is shown. This copending application provides an example of a dynamo-electric machine in which features of the present invention are advantageously used. Such a dynamoelectric machine further includes switching means with a spring biased actuating arm 23 engageable by a radially outwardly extending flange 24 of an annular sliding sleeve 25. Axial movement of the sliding sleeve 25 back and forth on the shaft 20 occurs due to pivotal engagement thereof by arms 26 having an elbow-shaped or L-shaped body portion which has U-shaped fingers or weights 27 secured thereto. The specific configuration of these weights 27 is such that upon increase of speed the weights move radially outwardly and the sliding sleeve 25 is shifted axially along the shaft 20. A pair of oppositely located spring means 28 with opposite ends thereof hooked to the arms or finger structure 26 at an intermediate location will assure biasing of the weights into a radially inward location. A backing member 29 has a centrally apertured cylindrical inner portion 29c which is press fitted onto the knurled portion 21 of the shaft 20. This backing member 29 also has a pair of tangs 29t which are bent to leave openings or apertures 29a in the backing member 29. These openings or apertures 29a are located in a flange portion 29f such that collectively the flange portion 29f and tank 29t on each side will form a V-shaped spacing or configuration. Radially outer ends 29e of the backing plate or rigid member 29 have a central V-shaped embossment 29v complementary to a projection 26p of the fingers or arms 26. An ending 26e of the arms or fingers is axially engageable against and radially slidable along a plastic plate portion 30 also engaged by the weights 27. This plastic plate 30 has a central aperture 31 complementary to shaft 20. The plastic plate portion is fitted on one side of the backing member 29 and has laterally undercut or slotted portions 32 adjacent to opposite ends thereof. Diagonally or diametrically opposite ends 30e of this plastic plate best seen in FIGURE 4 are interlocked by these slots 32 with the backing member 29 adjacent to the flange portions 29f thereof. The plastic plate 30 serves as an axial stop or resilient snubber-bumper for the sliding sleeve 25 when the weights are in a radially outer position. When such weights are in a radially outer position the ending 26e of the fingers or arms 26 have moved radially outwardly in sliding engagement with the plastic plate 30 into a location in engagement with the ending 30e of the plastic plate 30. The ending 30e of the plastic plate is located in the V-shaped spacing between tangs 29t and flanges 29f.

Figure 2:
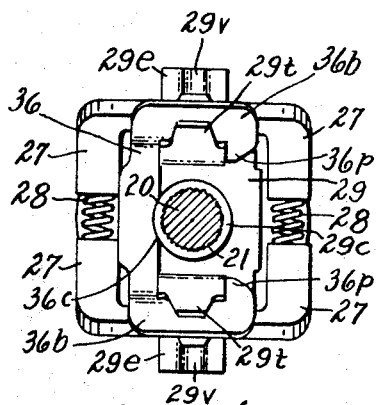
FIGURE 2 is a cross-sectional and plan view of structure taken along line 2—2 in FIGURE 1.
Figure 3:
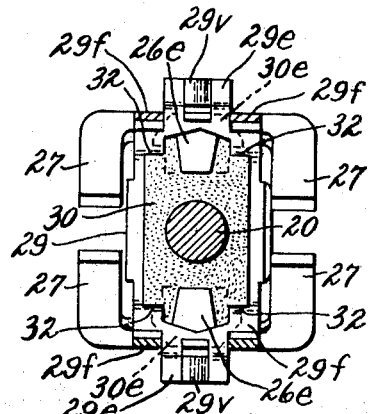
FIGURE 3 is a cross-sectional and plan view of structure taken along line 3—3 in FIGURE 1.

As a resilient backing for the ends 30e a spring means 36 having a C-shaped body portion has sliding interlock fit on a side of the backing member 29 opposite to that side engaged by the plastic plate 30. The C-shaped spring means 36 is illustrated in assembled relationship in FIGURES 2 and 3 and in a perspective plan view in FIGURE 4. Individual parts of the features in accordance with the present invention are best seen in the exploded perspective view of FIGURE 4. The C-shaped spring means 36 has a central portion offset radially outwardly with recessing 36c complementary to the cylindrical portion 29c. Also the spring means 36 has a pair of inward projections 36p which interlock with the tangs 29t along edging of one side thereof. The spring means 36 includes parallel and laterally opposite backing portions 36b which resiliently bias the ends 30e of the plastic plate 30 during assembled relationship thereof.

The C-shaped spring means is inexpensive and easy to assemble with the backing member 29. Also the C-shaped spring means 36 is readily replaced as in the plastic member 30 in the event any wear or defect occurs therein. Chiefly, the spring means 36 having the C-shaped configuration is slidable into assembled relationship for snubbing and resilient backing or biasing purposes as to the plastic plate 30 without requiring disassembly to replace such spring biasing. The spring means 36 has a dual function of both fastening as well as snubbing or serving as a bumper as a result of the slidable interfit laterally or radially as to the shaft 20. The plastic plate adds resiliency as a supplement to the spring means. The plastic plate is made of a suitable low-friction material such as polytetrafluoroethylene or fluorine-containing plastic. Also the plastic plate is suitable if made of polyethylene material.

The plastic plate or sheet means 30 is held in place both by the slots 32 interlocked with the backing member 29 of metal as well as by the body portions 36b of the spring means which in turn are interlocked by the projections 36p. Also, the plastic plate or sheet means 30 serves as a resilient shim of differing thickness if necessary for adjustment which is identical on each of radially opposite sides. The ends or ears 30e of the plastic plate or sheet means 30 are readily bendable though resiliently backed and biased by the spring means portions 36b.

Reference is made to a Patent 2,747,854, Schnepf, issued May 29, 1956 to the assignee of the present invention, concerning a snap acting speed responsive device and operation thereof. The resilient snubber structure for such a speed responsive device or governor assembly represents improvement over structure previously found to be subject to noise or "buzzing" during certain phases of operation. Such noise is eliminated by the assembly and structural features added in accordance with the present invention. The snubber structure suppresses the noise previously associated with motor governors particularly where weights such as 27 under angular acceleration are caused to lag parts connected solidly to the rotor shaft 20. The ending or projection 26e as well as other arm and weight structure are resiliently biased against the plastic plate 30 and ends 30e thereof at least with a small force at all times thereby preventing the "buzz" noise due to retention of the finger assemblies and weights in a resilient rest or "nest" adjacent to the backing member 29 particularly as to the V-shaped configuration formed by the flanges 29f and tangs 29t. Bouncing of the axially shiftable sleeve 25 which previously could result in "double switching" or erratic switch operation is avoided because the plastic plate 30 is retained flat against one side of the backing member 29 while the spring means 36 maintains sandwich assembly of the plastic plate and spring means on opposite sides of the backing member. The spring means 36 except for biasing portions 36b has location on a reverse side of the shiftable member 25 in a location away from the shiftable member. Thus the "double switching" problem is eliminated.

While the embodiment of the present invention as herein disclosed, constitutes a preferred form, it is to be understood that other forms might be adopted.

What is claimed is as follows:

1. A centrifugal switch governor assembly comprising, a shaft mounted backing member having opposite flange and tang portions forming V-shaped recesses in radially opposite location, an axially slidable switch actuating member, pivotally movable arms in engagement with said switch actuating member for axial shift thereof, weight means carried by said arms, coil spring means biasing said arms and weights in a predetermined direction, a plastic plate member located on one side of said backing member with respective opposite ends thereof extending through respective said V-shaped recesses of said backing member and resiliently engageable by said switch actuating member and a spring means located on the side of said backing member opposite the said plastic plate member engaging said tang portions of said backing member and said ends of said plastic plate member extending through said V-shaped recesses for resiliently backing the said ends of said plastic plate member.

2. The assembly of claim 1 wherein said spring means has a C-shaped configuration laterally installed and removable adjacent to said backing member.

3. The assembly of claim 2 wherein said C-shaped configuration has biasing portions adjacent to opposite ends of said plastic plate in an intermediate location of said V-shaped recessing.

4. The assembly of claim 2 wherein said backing member has a cylindrical portion in press fit on the shaft and said spring means has an arcuate recess complementary thereto.

5. The assembly of claim 1 wherein said plastic plate has opposite pairs of lateral slots that permit interlock with edging of openings left by said tang portions at juncture thereof with said flange portions of said backing member.

6. The assembly of claim 5 wherein said plastic plate has opposite ends backed by said spring means and resiliently engageable at least by said weight means having U-shaped configuration collectively free of noise.

7. The assembly of claim 5 wherein said plastic plate is made of polytetrafluoroethylene.

8. The assembly of claim 5 wherein said plastic plate is made of polyethylene.

9. The assembly of claim 1 wherein said arms have an elbow-shaped configuration of which one end of each engages said plastic plate.

References Cited

UNITED STATES PATENTS

| | | | |
|---|---|---|---|
| 1,821,406 | 9/1931 | Sawin | 248—358 |
| 1,892,943 | 1/1933 | Geyer | 248—358 |
| 2,322,844 | 6/1943 | Goldschmidt | 248—358 |
| 2,353,943 | 7/1944 | Storch | 248—358 |
| 2,353,944 | 7/1944 | Storch | 248—358 |
| 2,415,280 | 2/1947 | Fink | 248—358 |
| 2,455,891 | 12/1948 | Flanagan | 248—358 |
| 2,460,829 | 2/1949 | Ivanovic | 248—358 |
| 2,688,479 | 9/1954 | Barbera | 248—358 |
| 2,938,700 | 5/1960 | Castle | 248—358.1 |
| 3,028,138 | 4/1962 | Wells | 248—358 |
| 3,060,538 | 10/1962 | Simi | 248—358 |
| 3,218,101 | 11/1965 | Adams | 248—358 |
| 3,353,632 | 11/1967 | Perhach | 248—358 |

FOREIGN PATENTS

| | | |
|---|---|---|
| 584,991 | 1/1947 | Great Britain. |
| 1,078,442 | 8/1967 | Great Britain. |

OTHER REFERENCES

Product Engineering, Aug. 20, 1962, pp. 56, 57; "How to Damp Axial and Rotational Motion."

JAMES J. GILL, *Primary Examiner.*

R. S. SALZMAN, *Assistant Examiner.*

U.S. Cl. X.R.

248—358